United States Patent
Kim

(10) Patent No.: US 11,607,996 B2
(45) Date of Patent: Mar. 21, 2023

(54) APPARATUS FOR ASSISTING DRIVING, VEHICLE HAVING THE SAME, AND METHOD OF CONTROLLING THE SAME

(71) Applicant: MANDO CORPORATION, Pyeongtaek-si (KR)

(72) Inventor: Dookyum Kim, Hwaseong-si (KR)

(73) Assignee: HL Klemove Corp., Incheon (KR)

( * ) Notice: Subject to any disclaimer, the term of this patent is extended or adjusted under 35 U.S.C. 154(b) by 31 days.

(21) Appl. No.: 17/335,451

(22) Filed: Jun. 1, 2021

(65) Prior Publication Data

US 2021/0370831 A1   Dec. 2, 2021

(30) Foreign Application Priority Data

Jun. 2, 2020 (KR) .................. 10-2020-0066169

(51) Int. Cl.
*B60R 1/00* (2022.01)
*B60K 35/00* (2006.01)
(Continued)

(52) U.S. Cl.
CPC ............... *B60R 1/00* (2013.01); *B60K 35/00* (2013.01); *G06V 20/58* (2022.01); *G06V 20/588* (2022.01);
(Continued)

(58) Field of Classification Search
CPC ...... B60K 2370/1529; B60K 2370/166; B60K 2370/167; B60K 2370/176; B60K 2370/177; B60K 2370/178; B60K 2370/1868; B60K 2370/21; B60K 2370/334; B60K 2370/785; B60K 35/00; B60K 2370/152; B60K 2370/736; B60R 1/00; B60R 1/24; B60R 2300/205;
(Continued)

(56) References Cited

U.S. PATENT DOCUMENTS

| 2013/0010117 A1* | 1/2013 | Miyoshi | G06F 3/0412 |
| | | | 348/148 |
| 2014/0236473 A1* | 8/2014 | Kondo | G01C 21/3647 |
| | | | 701/400 |

(Continued)

FOREIGN PATENT DOCUMENTS

| JP | 2018-103863 A | 7/2018 |
| JP | 2019-64317 A | 4/2019 |
| KR | 10-2017-0111084 A | 10/2017 |

OTHER PUBLICATIONS

Office Action issued in corresponding Korean Patent Application No. 10-2020-0066169, dated Jul. 29, 2021.

*Primary Examiner* — Farzana Hossain
(74) *Attorney, Agent, or Firm* — Morgan, Lewis & Bockius LLP

(57) ABSTRACT

A vehicle of the disclosure includes an apparatus for assisting driving of a host vehicle. The apparatus for assisting driving of the host vehicle includes a display configured to display vehicle driving information; an image obtainer configured to obtain an image of a road; a distance detector configured to detect surrounding objects; and a controller configured to calculate notification information based on the obtained image information of the road, the detected surrounding objects, and the vehicle driving information, and to display the calculated notification information to a driver in real time.

15 Claims, 9 Drawing Sheets

(51) Int. Cl.
  *G06V 20/58* (2022.01)
  *G06V 20/56* (2022.01)
(52) U.S. Cl.
  CPC ............ *B60K 2370/1529* (2019.05); *B60K 2370/166* (2019.05); *B60K 2370/167* (2019.05); *B60K 2370/177* (2019.05); *B60R 2300/205* (2013.01); *B60R 2300/8093* (2013.01)
(58) Field of Classification Search
  CPC ...... B60R 2300/308; B60R 2300/8093; B60R 21/0134; G06V 20/58; G06V 20/588; B60W 50/14; B60W 30/08; B60W 40/02; B60W 40/105; B60W 2050/146; B60W 2510/207; B60W 2520/10; B60W 2552/50; B60Y 2300/08; B60Y 2400/92
  See application file for complete search history.

(56) References Cited

U.S. PATENT DOCUMENTS

| | | | |
|---|---|---|---|
| 2015/0194082 A1* | 7/2015 | McEwan | G09F 13/20 40/591 |
| 2020/0378778 A1* | 12/2020 | Glazberg | B60T 8/17 |
| 2020/0398836 A1* | 12/2020 | Wu | B60W 30/16 |

\* cited by examiner

APPARATUS FOR ASSISTING DRIVING, VEHICLE HAVING THE SAME, AND METHOD OF CONTROLLING THE SAME

CROSS-REFERENCE TO RELATED APPLICATION(S)

This application is based on and claims priority under 35 U.S.C. § 119 to Korean Patent Application No. 10-2020-0066169, filed on Jun. 2, 2020, the disclosure of which is incorporated herein by reference.

BACKGROUND

1. Field

The disclosure relates to a driver assistance system, and more particularly, to a driver assistance display apparatus that displays various image information for safe driving of a driver in a vehicle, the vehicle having the same, and a driver assistance display method.

2. Description of Related Art

In order to prevent accidents caused by a driver's carelessness, various advanced driver assistance systems (ADAS) have been developed to transmit driving information of a vehicle to the driver and for autonomous driving for the driver's convenience.

Among the ADAS, automatic emergency braking (AEB) using vision sensors, blind spot detection (BSD), and lane keeping assistance systems (LKAS) is being used.

As an example, the LKAS may obtain an image of a road ahead from a camera attached to the vehicle, recognize a lane adjacent to a currently driving lane from the obtained image. When the lane is departed from the driving lane, the LKAS may output a warning sound or a guide sound to prevent the accidents caused by lane departure from the driving lane.

However, in the case of the existing warning sound or the guide sound, the emphasis was placed on simply expressing information about an operation of the system, an operation state, and a presence or absence of control, and thus the information of a number of sensors received in an actual vehicle was limitedly expressed to the driver. Accordingly, there is a limit to actively inducing safe driving to the driver.

SUMMARY

An aspect of the disclosure provides a driver assistance display apparatus for displaying various types of sensors used in a driver assistance system to a driver, a vehicle having the same, and a driver assistance display method.

Another aspect of the disclosure provides a driver assistance display apparatus capable of assisting the driver to identify a driving state of a vehicle in advance prior to a steering and vehicle speed control operation by an operation of the driver assistance system, a vehicle having the same, and a driver assistance display method.

Additional aspects of the disclosure will be set forth in part in the description which follows and, in part, will be obvious from the description, or may be learned by practice of the disclosure.

According to an aspect of the disclosure, there is provided a display apparatus for assisting driving of a host vehicle, the apparatus including: a display configured to display vehicle driving information; an image obtainer configured to obtain an image of a road; a distance detector configured to detect surrounding objects; and a controller configured to provide notification information based on the image information of the road, the surrounding objects, and the vehicle driving information, and to display the notification information.

The controller may be configured to identify a central axis of a driving lane based on the image information of the road, and to simultaneously display the central axis of the driving lane and a central axis of a vehicle.

The controller may be configured to: in response to a curved road being included in a driving predicted route of a vehicle, determine that there is a risk of occurrence of an understeer based on a vehicle speed being greater than a preset first threshold value, and display the notification information including the risk of occurrence of the understeer.

The controller may be configured to: in response to an unevenness being included in a driving predicted route of a vehicle, determine that there is a risk of occurrence of an impact based on that a vehicle speed is greater than a preset second threshold value, and display the notification information including the risk of occurrence of the impact.

Based on determining that there is the risk of occurrence of the understeer, the notification information may be displayed to the driver in different colors according to a size of the vehicle speed.

Based on determining that there is the risk of occurrence of the impact, the notification information may be displayed to the driver in different colors according to a size of the vehicle speed.

The controller may be configured to: generate divided around views of a vehicle, and based on an obstacle being detected in any one of the divided around views, differently display a color of a compartment in which the obstacle is detected.

The display may include at least one of a head up display (HUD), a cluster, an augmented reality navigation, or an augmented reality windshield.

According to another aspect of the disclosure, there is provided a method for assisting driving of a host vehicle, the method including: obtaining, by an image obtainer, an image of a road; detecting, by a distance detector, surrounding objects; providing, by a controller, notification information based on the image information of the road, the surrounding objects, and the vehicle driving information; and displaying, by the controller, the notification information.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
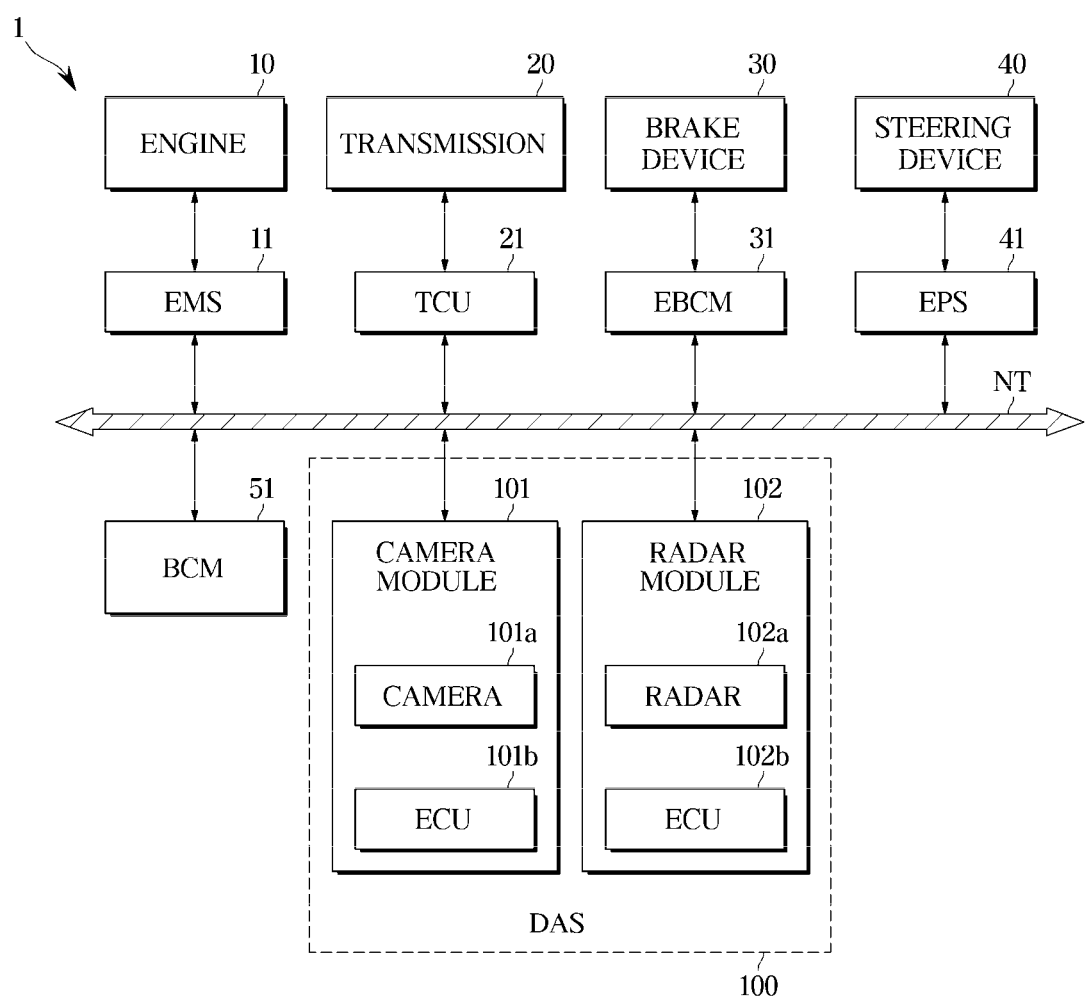
FIG. 1 is a view illustrating a configuration of a vehicle according to an embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Hereinafter, an operation principle and embodiments of the disclosure will be described with reference to accompanying drawings.

FIG. 1 is a view illustrating a configuration of a vehicle according to an embodiment.

Referring to FIG. 1, a vehicle 1 may include an engine 10, a transmission 20, a braking device 30, and a steering device 40.

The engine 10 may include a cylinder and a piston, and may generate power for the vehicle 1 to drive. The transmission 20 may include a plurality of gears, and may transmit power generated by the engine 10 to wheels. The braking device 30 may decelerate or stop the vehicle 1 through friction with the wheels. The steering device 40 may change a driving direction of the vehicle 1.

The vehicle 1 may include a plurality of electrical components.

For example, the vehicle 1 further includes an engine management system (EMS) 11, a transmission control unit (TCU) 21, and an electronic brake control module (EBCM) 31), an electronic power steering (EPS) 41, a body control module (BCM), and a driver assistance system (DAS) 100.

The EMS 11 may control the engine 10 in response to an acceleration intent of a driver through an accelerator pedal or a request of the DAS 100. For example, the EMS 11 may control torque of the engine 10.

The TCU 21 may control the transmission 20 in response to a shift command of the driver through a shift lever and/or a driving speed of the vehicle 1. For example, the TCU 21 may adjust the gear ratio from the engine 10 to the vehicle wheels.

The EBCM 31 may control the braking device 30 in response to a braking intent of a driver through a braking pedal and/or a slip of the vehicle wheels. For example, the EBCM 31 may temporarily release the braking of the vehicle wheel in response to a slip of the vehicle wheel sensed at a time of braking of the vehicle 1 (anti-lock braking systems, ABS). The EBCM 31 may selectively release braking of the vehicle wheel in response to over-steering and/or under-steering sensed at a time of steering of the vehicle 1 (electronic stability control, ESC). In addition, the EBCM 31 may temporarily brake the vehicle wheels in response to a slip of the vehicle wheel sensed at a time of driving of the vehicle 1 (traction control system, TCS).

The EPS 41 may assist the operation of the steering device 40 so that the driver easily manipulates a steering wheel, in response to a steering intent of the driver through the steering wheel. For example, the EPS 41 may assist the operation of the steering device 40 such that the steering force is reduced during low-velocity traveling or parking and is increased during high-velocity traveling.

The BCM 51 may control the operation of the electronic components that provide convenience to the driver or ensure the safety of the driver. For example, the BCM 51 may control a head lamp, a wiper, a cluster, a multifunction switch, a turn signal lamp, and the like.

The DAS 100 may assist the driver in manipulating (driving, braking, steering) the vehicle 1. For example, the DAS 100 may detect an environment of a road on which the vehicle 1 is driving (e.g., other vehicles, pedestrians, cyclists, lanes, road signs, etc.).

The DAS 100 may provide various functions to the driver. For example, the DAS 100 may include lane departure warning (LDW), lane keeping assist (LKA), high beam assist (HBA), autonomous emergency braking (AEB), traffic sign recognition (TSR), smart cruise control (SCC), and blind spot detection (BSD).

The DAS 100 may include a camera module 101 for obtaining image data around the vehicle 1 and a radar module 102 for obtaining object data around the vehicle 1.

The camera module 101 may include a camera 101*a* and an electronic control unit (ECU) 101*b*, and may capture the front of the vehicle 1 and recognize other vehicles, pedestrians, cyclists, lanes, road signs, traffic lights, and the like.

The radar module 102 may include a radio detecting and ranging (radar) 102*a* and an electronic control unit (ECU) 102*b*, and may obtain relative positions and relative speeds of objects (e.g., other vehicles, pedestrians, cyclists, and the like) around the vehicle 1.

The above described electronic components may communicate with each other through a vehicle communication network NT. For example, the electrical components may exchange data therebetween through Ethernet, media oriented systems transport (MOST), Flexray, controller area network (CAN), local interconnect network (LIN), and the like. For example, the DAS 100 may transmit a driving signal, a braking signal, and a steering signal to the EMS 11, the EBCM 31, and the EPS 41, respectively, through the NT.

Figure 2:
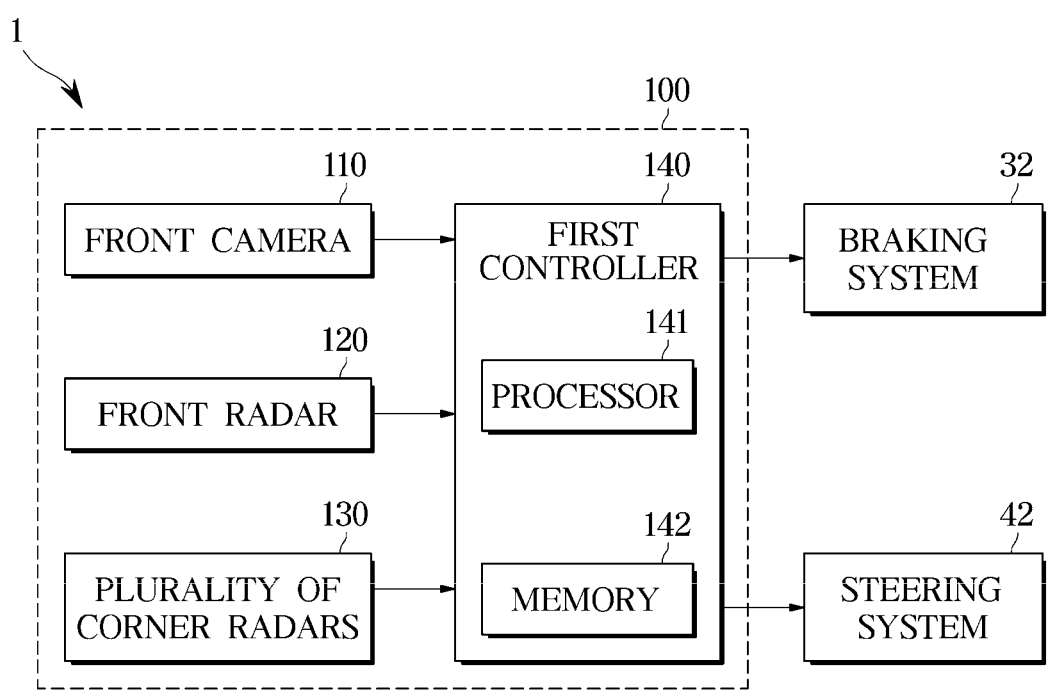
FIG. 2 is a view illustrating a configuration of a driver assistance system provided in a vehicle according to an embodiment.
Figure 3:
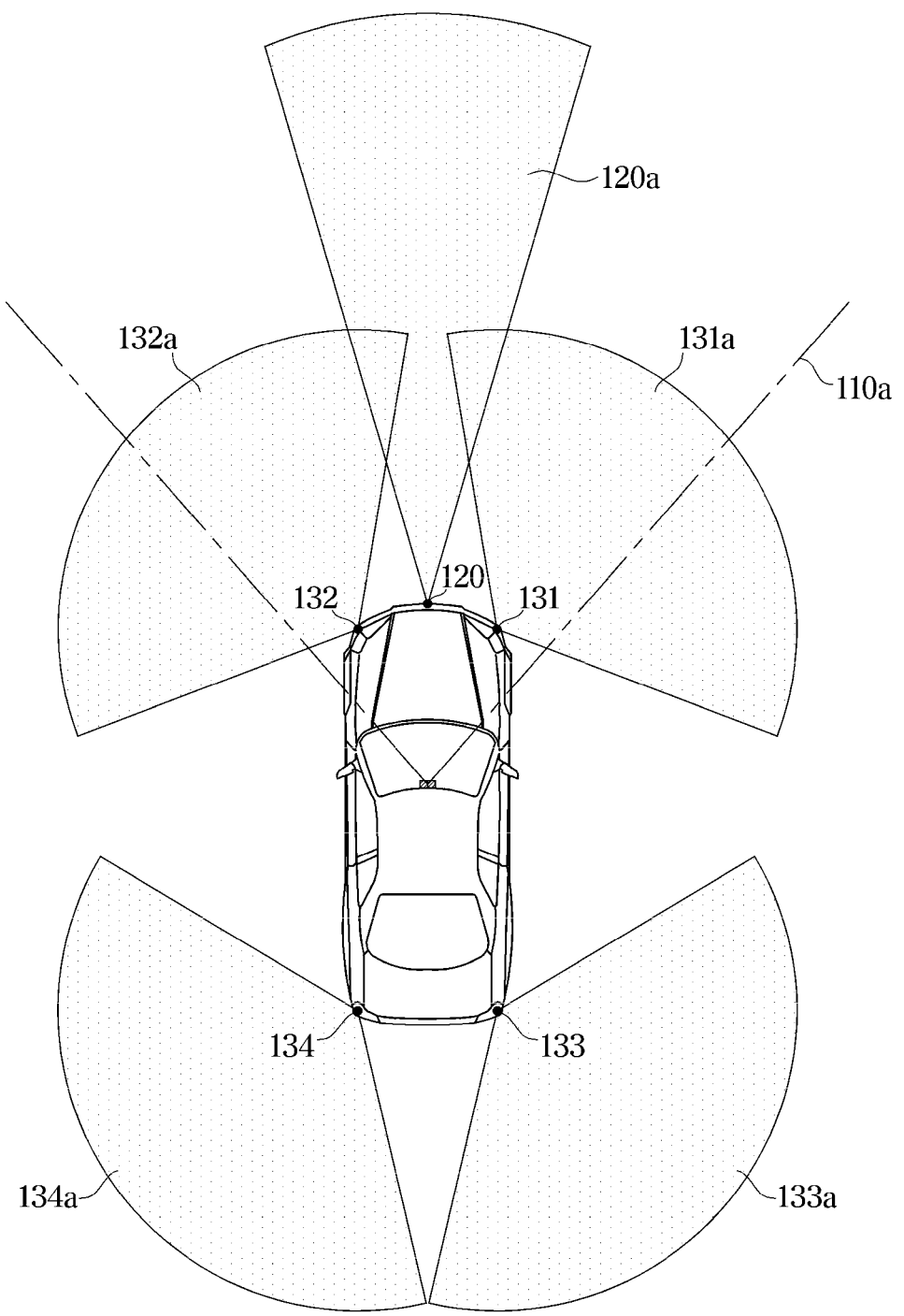
FIG. 3 is a view illustrating a detection area of a camera and a radar included in a driver assistance system of a vehicle according to an embodiment.

FIG. 2 is a view illustrating a configuration of a driver assistance system provided in a vehicle according to an embodiment, and FIG. 3 is a view illustrating a detection area of a camera and a radar included in a driver assistance system of a vehicle according to an embodiment.

Referring to FIG. 2, the vehicle 1 may include a braking system 32, a steering system 42, and the DAS 100.

The braking system 32 may include the EBCM 31 (see FIG. 1) and the braking device 30 (see FIG. 1) described in conjunction with FIG. 1, and the steering system 42 may include the EPS 41 (see FIG. 1) and the steering device 40 (see FIG. 1).

The DAS 100 may include a front camera 110, a front radar 120, and a plurality of corner radars 130.

Referring to FIG. 3, the front camera 110 may have a field of view 110a directed to the front of the vehicle 1. The front camera 110 may be installed, for example, on a front windshield of the vehicle 1.

The front camera 110 may image the front of the vehicle 1 and obtain image data regarding the front of the vehicle 1. The image data regarding the front of the vehicle 1 may include position information about at least one of other vehicles, pedestrians, cyclists, lanes, curbs, guardrails, street trees, and streetlights located in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to a first controller 140. For example, the front camera 110 may be connected to the first controller 140 through the vehicle communication network NT, through a hard wire, or through a printed circuit board (PCB).

The front camera 110 may transmit the image data regarding the front of the vehicle 1 to the first controller 140.

The plurality of corner radars 130 may have a field of sensing 120a directed to the front of the vehicle 1. The plurality of corner radars 130 may be installed, for example, on a grille or a bumper of the vehicle 1.

The plurality of corner radars 130 may include a transmission antenna (or a transmission antenna array) that radiates transmission radio waves to the front of the vehicle 1 and a reception antenna (or a reception antenna array) that receives reflection radio waves reflected from an obstacle.

The plurality of corner radars 130 may obtain front radar data and rear radar data from the transmission radio waves transmitted by the transmission antenna and the reflection radio waves received by the reception antenna.

The front radar data may include position information and speed information regarding an obstacle, such as other vehicles, pedestrians, or cyclists existing in front and rear of the vehicle 1.

The plurality of corner radars 130 may calculate the relative distance to the obstacle based on the phase difference (or time difference) between the transmission radio waves and the reflection radio waves, and calculate the relative speed of the object based on the frequency difference between the transmission radio waves and the reflected radio waves.

The plurality of corner radars 130 may be connected to the first controller 140 through the vehicle communication network NT, the hard wire, or the PCB. The front radar 120 may transmit the front radar data and the rear radar data to the first controller 140.

The plurality of corner radars 130 may include a first corner radar 131 mounted to a forward right side of the vehicle 1, a second corner radar 132 mounted to a forward left side of the vehicle 1, a third corner radar 133 mounted to a rear right side of the vehicle 1, and a fourth corner radar 134 mounted to a rear left side of the vehicle 1.

As illustrated in FIG. 3, the first corner radar 131 may include a field of sensing (FOS) 131a oriented to a forward right area of the vehicle 1. For example, the first corner radar 131 may be mounted to a right side of a front bumper of the vehicle 1. The second corner radar 132 may include an FOS 132a oriented to a forward left area of the vehicle 1, and may be mounted to, for example, a left side of the front bumper of the vehicle 1. The third corner radar 133 may include an FOS 133a oriented to a rear right area of the vehicle 1, and may be mounted to, for example, a right side of a rear bumper of the vehicle 1. The fourth corner radar 134 may include an FOS 134a oriented to a rear left area of the vehicle 1, and may be mounted to, for example, a left side of the rear bumper of the vehicle 1.

Each of the first, second, third, and fourth radars 131, 132, 133, and 134 may include a transmission (Tx) antenna and a reception (Rx) antenna.

The first, second, third, and fourth corner radars 131, 132, 133, and 134 may respectively obtain first corner radar data, second corner radar data, third corner radar data, and fourth corner radar data.

The first corner radar data may include information about a distance between the vehicle 1 and the object (e.g., other vehicles, pedestrians, or cyclists) present in a forward right area of the vehicle 1, and information about the speed of the object. The second corner radar data may include information about a distance between the vehicle 1 and an object (e.g., other vehicles, pedestrians, or cyclists) present in a forward left area of the vehicle 1, and information about the speed of the object. The third corner radar data may include information about a distance between the vehicle 1 and an object (e.g., other vehicles, pedestrians, or cyclists) present in a rear right area of the vehicle 1, and information about the speed of the object. The fourth corner radar data may include information about a distance between the vehicle 1 and an object (e.g., other vehicles, pedestrians, or cyclists) present in a rear left area of the vehicle 1, and information about the speed of the object.

Each of the first, second, third, and fourth corner radars 131, 132, 133, and 134 may be connected to the first controller 140 through, for example, the vehicle communication network NT, the hard wire, or the PCB. The first, second, third, and fourth corner radars 131, 132, 133, and 134 may respectively transmit first corner radar data, second corner radar data, third corner radar data, and fourth corner radar data to the first controller 140.

The first controller 140 may include the ECU 101b (see FIG. 1) of the camera module 101 (see FIG. 1) and/or the ECU 102b (see FIG. 1) of the radar module 102 (see FIG. 1), and/or an integrated ECU.

The first controller 140 includes a processor 141 and a memory 142.

The processor 141 may process front image data of the front camera 110, the front radar data of the plurality of corner radars 130, and the corner radar data of the plurality of corner radars 130, and may generate a braking signal and a steering signal for controlling the braking system 32 and the steering system 42.

For example, the processor 141 may include an image signal processor for processing the front image data of the front camera 110 and/or a digital signal processor for processing the radar data of the radars 120 and 130 and/or a micro control unit (Micro Control Unit, MCU) for generating the braking signal and the steering signal.

The processor 141 may detect the objects (for example, other vehicles, pedestrians, cyclists, curbs, guardrails, street trees, streetlights, etc.) in front of the vehicle 1 based on the front image data of the front camera 110 and the front radar data of the plurality of corner radars 130.

The processor 141 may obtain position information (distance and direction) and speed information (relative speed) of the objects in front of the vehicle 1 based on the front radar data of the plurality of corner radars 130. The processor 141 may obtain the position information (direction) and type information (e.g., whether the object is another vehicle or the pedestrian, or the cyclist or the curb, or the guardrail, or the street tree, or the streetlight, etc.) of the objects in front of the vehicle 1 based on the front image data of the front camera 110.

In addition, the processor 141 may match the objects detected by the front image data to the objects detected by the front radar data, and obtain the type information, the position information, and the speed information of the objects in front of the vehicle 1 based on a result of the matching.

The processor 141 may generate the braking signal and the steering signal based on the type information, the position information, and the speed information of front objects.

In addition, the processor 141 may obtain a speed of the vehicle 1. In this case, the speed of the vehicle 1 is not illustrated, but may be obtained through a wheel speed sensor mounted on a vehicle wheel.

For example, the processor 141 may calculate a time to collision (TTC) between the vehicle 1 and the front object based on the position information (distance) and the speed information (relative speed) of the front objects, and may warn the driver of a collision or transmit the braking signal to the braking system 32 based on a comparison result between the TTC and a predetermined reference time.

In response to the TTC being less than a predetermined first reference time, the processor 141 may output a warning through audio and/or a display.

In response to the TTC being less than a predetermined second reference time, the processor 141 may transmit a pre-braking signal to the braking system 32.

In response to the TTC being less than a predetermined third reference time, the processor 141 may transmit an emergency braking signal to the braking system 32. In this case, the second reference time is smaller than the first reference time, and the third reference time is smaller than the second reference time.

As another example, the processor 141 may calculate a distance to collision (DTC) based on the speed information (relative speed) of the front objects, and may warn the driver of the collision or transmit the braking signal to the braking system 32 based on a comparison result between the DTC and a distance to the front objects.

The processor 141 may obtain the position information (distance and direction) and the speed information (relative speed) of the objects on the side of the vehicle 1 (front right, front left, rear right, rear left) based on the corner radar data of the plurality of corner radars 130.

The memory 142 may store programs and/or data for processing image data by the processor 141, programs and/or data for processing radar data by the processor 141, and programs and/or data for generating the braking signal and/or the steering signal and/or the control signal by the processor 141.

The memory 142 may temporarily memorize the image data received from the front camera 110 and/or the radar data received from the radars 120 and 130, and may temporarily memorize a result of processing the image data and/or the radar data of the processor 141.

The memory 142 may not only include a volatile memory, such as an S-RAM, a D-RAM, and the like, but also include a non-volatile memory, such as a flash memory, a read only memory (ROM), an erasable programmable read only memory (EPROM), and the like.

Figure 4:
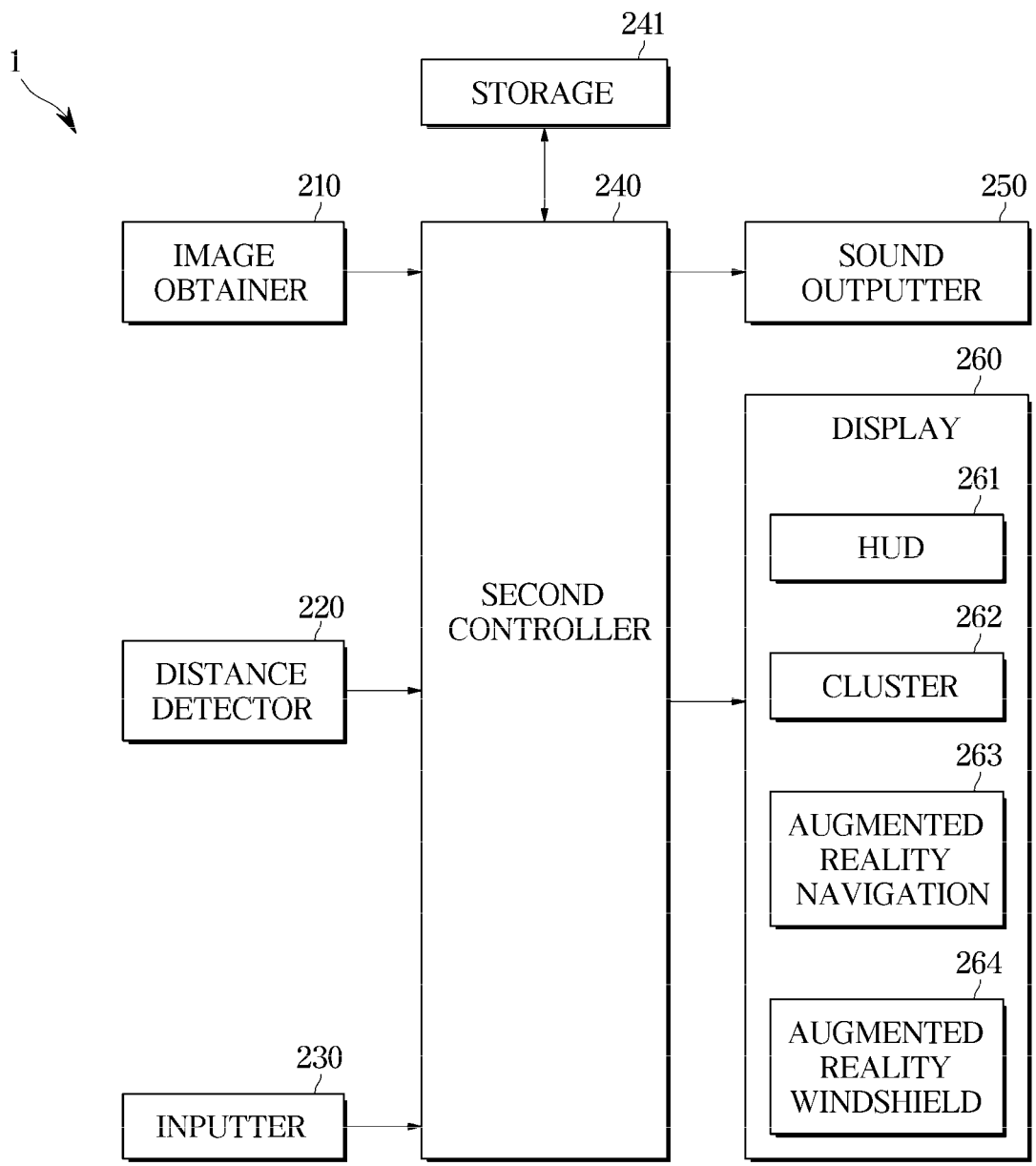
FIG. 4 is a view illustrating a configuration of a driver assistance display apparatus provided in a vehicle according to an embodiment.

FIG. 4 is a view illustrating a configuration of a driver assistance display apparatus provided in a vehicle according to an embodiment.

A driver assistance display apparatus 200 provided in the vehicle 1 may include an image obtainer 210, a distance detector 220, an inputter 230, a second controller 240, a storage 241, a sound outputter 250, and a display 260.

The image obtainer 210 may obtain an image of the road and transmit information of the obtained image to the second controller 240. Here, the image information may be image data.

The image obtainer 210 may include the front camera 110, and may obtain the image information of the road from the front image data captured by the front camera.

The distance detector 220 may detect the left and right objects of a host vehicle and transmit object information on the detected object to the second controller 240.

The distance detector 220 may include the plurality of corner radars 130 and first and second corner radars 131 and 132.

In addition, the distance detector 220 may include a Light Detection And Ranging (LiDAR) sensor.

The LiDAR sensor may be a non-contact distance detection sensor using a principle of laser radar.

The LiDAR sensor may include a transmitter for transmitting a laser and a receiver for receiving a laser that is reflected on a surface of the object existing within a sensor range and returned.

Here, the laser may be a single laser pulse.

For reference, since the LiDAR sensor has higher detection accuracy in a lateral direction than a Radio Detecting And Ranging (radar) sensor, it is possible to increase an accuracy of a process of determining whether a passage exists in the front.

The distance detector 220 may include an ultrasonic sensor.

The ultrasonic sensor may generate ultrasonic waves for a certain time and then detect a signal that is reflected from the object and returned.

The ultrasonic sensor may be used to determine the presence or absence of an obstacle such as the pedestrian within a short range.

The inputter 230 may receive an on/off command of the driver assistance display apparatus 200.

The inputter 230 may also receive an on/off command of an operation mode associated with the driver assistance display apparatus 200. For example, the operation mode associated with the driver assistance display apparatus may include a function of expressing vehicle central axis information, a function of expressing whether or not the vehicle 1 is speeding on a curved road, a function of expressing whether or not the vehicle 1 is speeding due to unevenness, and a function of displaying vehicle peripheral recognition information.

Figure 5:
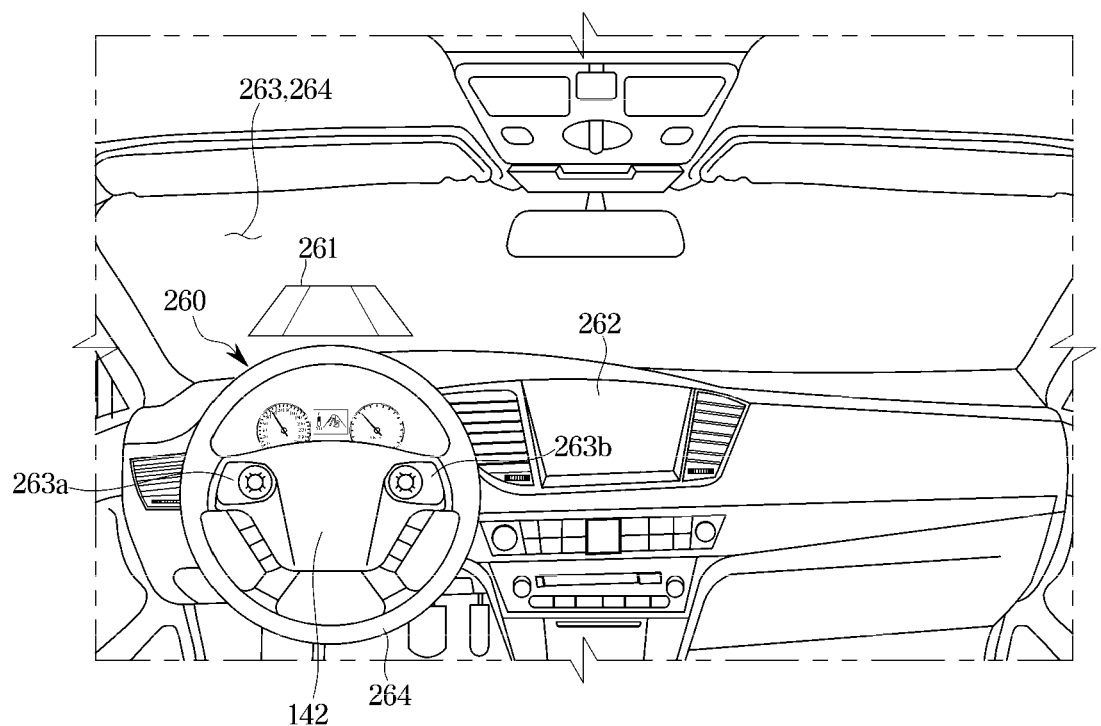
FIG. 5 is an exemplary view illustrating a display unit of a driver assistance display apparatus provided in a vehicle according to an embodiment.

Next, the display 260 may display the image, turn on and turn off, in response to a control command of the second controller 240. First, after the display 260 has been described based on FIGS. 4 and 5, a method of controlling the second controller 240 will be described based on the exemplary views of FIGS. 6 to 9 and the flowcharts of FIGS. 10 to 12.

The display 260 may display various functions of the driver assistance display apparatus 200. When a lane keeping mode is in progress, information about lane departure may be displayed. The display 260 may be a lamp such as an LED or a flat panel display device such as an LCD.

The display 260 may also display on-off information of the operation mode linked to the lane keeping mode. At this time, the display 260 may display performance information of the lane keeping mode and performance information of the operation mode linked to the lane keeping mode together.

The display 260 may include a head up display (HUD) 261, a cluster 262, an augmented reality navigation 263, or an augmented reality windshield 264.

The HUD 261 may project the image onto a windscreen. Particularly, the image projected on the windscreen by the HUD 261 may include vehicle operation information, road information, or a driving route, and guide or warn the user of the position information based on information received from a navigation system. You can also warn.

The cluster 262 may be provided on a dashboard to display the image. In particular, the cluster 262 may be provided adjacent to the windscreen so that the driver can obtain the vehicle operation information, the road information, or the driving route while a drivers gaze does not significantly deviate from the front of the vehicle 1.

Next, the augmented reality navigation 263 and the augmented reality windshield 264 may generate and show the image virtually on the windshield so that the driver's gaze does not deviate from the front of the vehicle 1. For example, although not illustrated, on a driving road, it is possible to display a predicted route in combination with a navigation function and combined with the driving road visible in the driver's windshield field of view.

Next, FIGS. 6 to 9 will be described a processing method of the function of expressing the vehicle central axis information, the function of expressing whether or not the vehicle 1 is speeding on the curved road, the function of expressing whether or not the vehicle 1 is speeding due to unevenness, and the function of displaying the vehicle peripheral recognition information performed by the second controller 240 of the driver assistance display apparatus 200 according to an embodiment.

However, the exemplary views of FIGS. 6 to 9 to be described later are illustrated assuming that the display 260 is the HUD 261, but is not necessarily limited to the HUD 261 and is not displayed to the driver. It does not matter if it is a configuration of various displays 260 constituting the driver assistance display apparatus 200.

Figure 6:
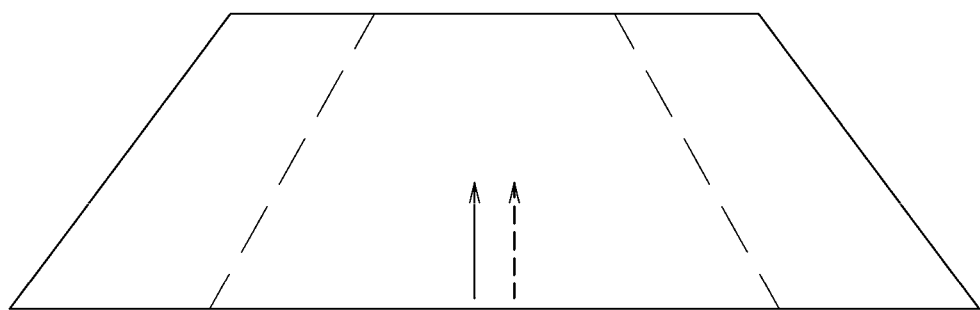
FIGS. 6 to 9 are views of a displayed screen of a driver assistance display apparatus according to an embodiment.

First, FIG. 6 is a view illustrating the function of expressing the vehicle central axis information by the second controller 240 in the driver assistance display apparatus 200 according to an embodiment.

That is, the second controller 240 may display a central axis (solid arrow) of the currently driving lane and a central axis (dotted arrow) of the currently host vehicle obtained based on the image obtainer 210 and the distance detector 220 on a screen, the driver may identify in real time whether the host vehicle is in a center of the lane in the current driving lane. Therefore, when there is a high risk of accidental contact between left and right due to a narrow road width during driving, such as a toll gate on a highway, it is possible to give an alert to the driver, thereby reducing the risk of accident.

Figure 7:
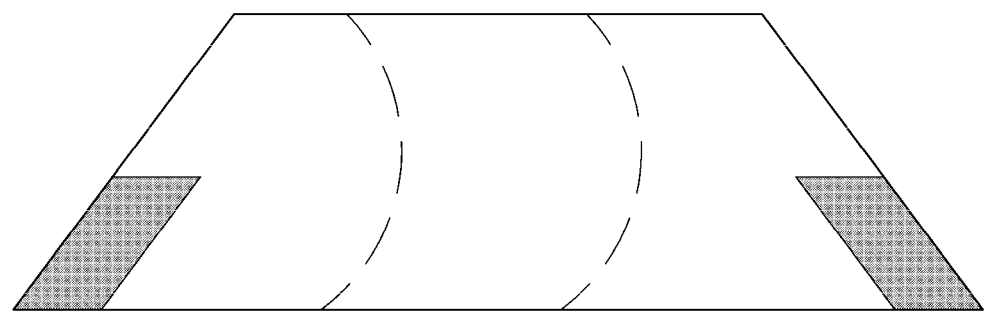

Next, FIG. 7 is a view illustrating the function of expressing whether or not the vehicle 1 is speeding on a curved line by the second controller 240 in the driver assistance display apparatus 200 according to an embodiment.

When the second controller 240 determines that there is the curved road in front of the currently driving road through the image obtainer 210, the distance detector 220, and the inputter 230, when the second controller 240 considers a curve radius and there is a risk of understeer (a risk of departure from the outside by an inertia) because the current vehicle speed is excessive, the driver may recognize it in advance and induce a deceleration. Particularly, referring to FIG. 7, as colors of the colored areas are displayed differently on both bottoms of the HUD 261, the second controller 240 may display a degree of risk caused by excessive vehicle speed when driving on the curved road. Particularly, when the speed of the vehicle is greater than a first threshold value, the second controller 240 may display the colored areas at both bottoms in red. When the speed of the vehicle is less than the first threshold value but greater than a second threshold value, the second controller 240 may display the colored areas at both bottoms in yellow. When the speed of the vehicle is less than the second threshold value and it is difficult to see that the risk of understeer occurs, the second controller 240 may display the colored areas at both bottoms in green.

Figure 8:
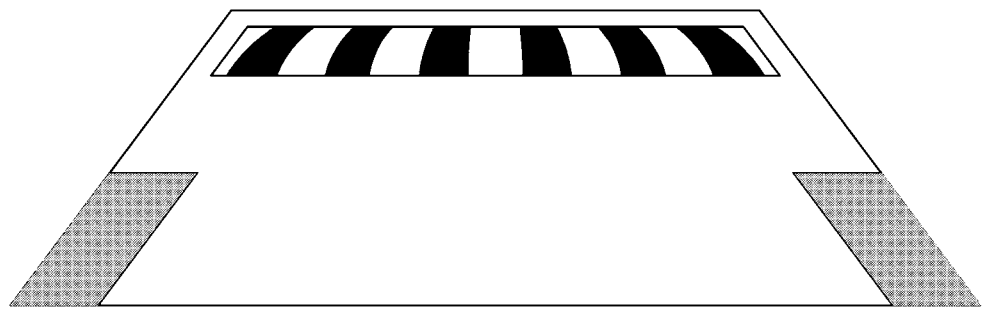

Next, FIG. 8 is a view illustrating the function of expressing whether or not the vehicle 1 is speeding due to unevenness by the second controller 240 in the driver assistance display apparatus 200 according to an embodiment.

When the second controller 240 determines that there are unevenness such as speed bumps in front of the currently driving road through the image obtainer 210, the distance detector 220 and the inputter 230, and predicts that a large impact is expected when the current vehicle speed is excessive and passes the unevenness, the driver may recognize it in advance and induce the deceleration. Particularly, referring to FIG. 8, as the colors of the colored areas are displayed differently on the both bottoms of the HUD 261, the second controller 240 may display a degree of impact caused by excessive speed of the vehicle when driving the vehicle 1 is driven with the unevenness in front. Particularly, when the speed of the vehicle is greater than a first threshold speed, the second controller 240 may display the colored areas at both bottoms in red. When the speed of the vehicle is less than the first threshold speed but greater than a second threshold speed, the second controller 240 may display the colored areas at both bottoms in yellow. When the speed of the vehicle is less than the second threshold speed and it is seen that an uneven passage is possible without a large impact, the second controller 240 may display the colored areas at both bottoms in green.

Figure 9:

In addition, as illustrated in FIG. 9, the driver assistance display apparatus 200 may include the function of displaying the vehicle peripheral recognition information.

Particularly, FIG. 9 is a view illustrating an around view of the vehicle and a section around the vehicle in the around view illustrated at a lower portion of one side of the HUD 261. Particularly, it is a view divided into a vehicle front, right front, left front and right side, left side, vehicle rear, right rear, and left rear. In particular, referring to FIG. 9, it is illustrated that the color is changed due to the proximity of the obstacle in front of the current vehicle. Therefore, the driver assistance display apparatus 200 may display different colors based on a proximity distance to the object obtained through the image obtainer 210 and the distance detector 220, so that the driver can intuitively recognize that the object is present in some sections around the current vehicle.

Accordingly, the driver assistance display apparatus 200 may provide an opportunity for the driver to avoid or decelerate by first recognizing it before steering control or braking control is autonomously performed based on the DAS 100.

Here, the second controller 240 of the driver assistance display apparatus 200 may be the same as or different from the first controller 140 of the DAS.

The storage 241 may store a preset vehicle width, and may store a preset distance and a reference distance for lane adjustment.

In addition, the storage 241 may pre-store equation information about a method of calculating the curve radius in a curved vehicle, and the storage 241 may include map information possessed by a navigation device.

That is, the storage 241 may store the position information of the road and an average lane width for each position information of the road accordingly.

The storage 241 may be implemented with at least one of the non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as a hard disk drive (HDD) or a compact disk (CD) ROM, without being limited thereto.

The storage 241 may be a memory implemented as a separate chip from the processor described above with respect to the second controller 240, or may be implemented as a processor and a single chip.

The sound outputter 250 may output a sound in response to a control command of the second controller 240.

The sound outputter 250 may output a warning sound when necessary for the operation of the driver assistance display apparatus 200. The sound outputter 250 may be a speaker.

The sound outputter 250 may display and output a notification sound at the same time when the warning is required to the driver, such as when the vehicle speeding in the curved line exceeds the first threshold value or the vehicle speed exceeds the first threshold speed due to the unevenness.

Figure 10:
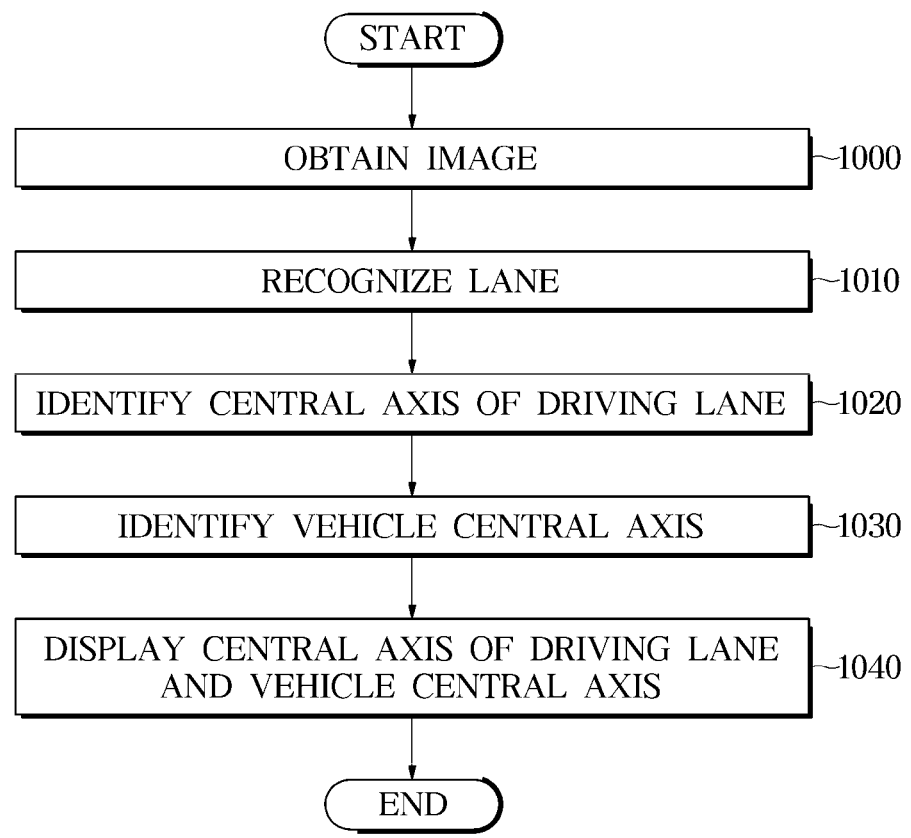
FIGS. 10 to 12 are control flowcharts of a driver assistance display apparatus according to an embodiment.
Figure 11:
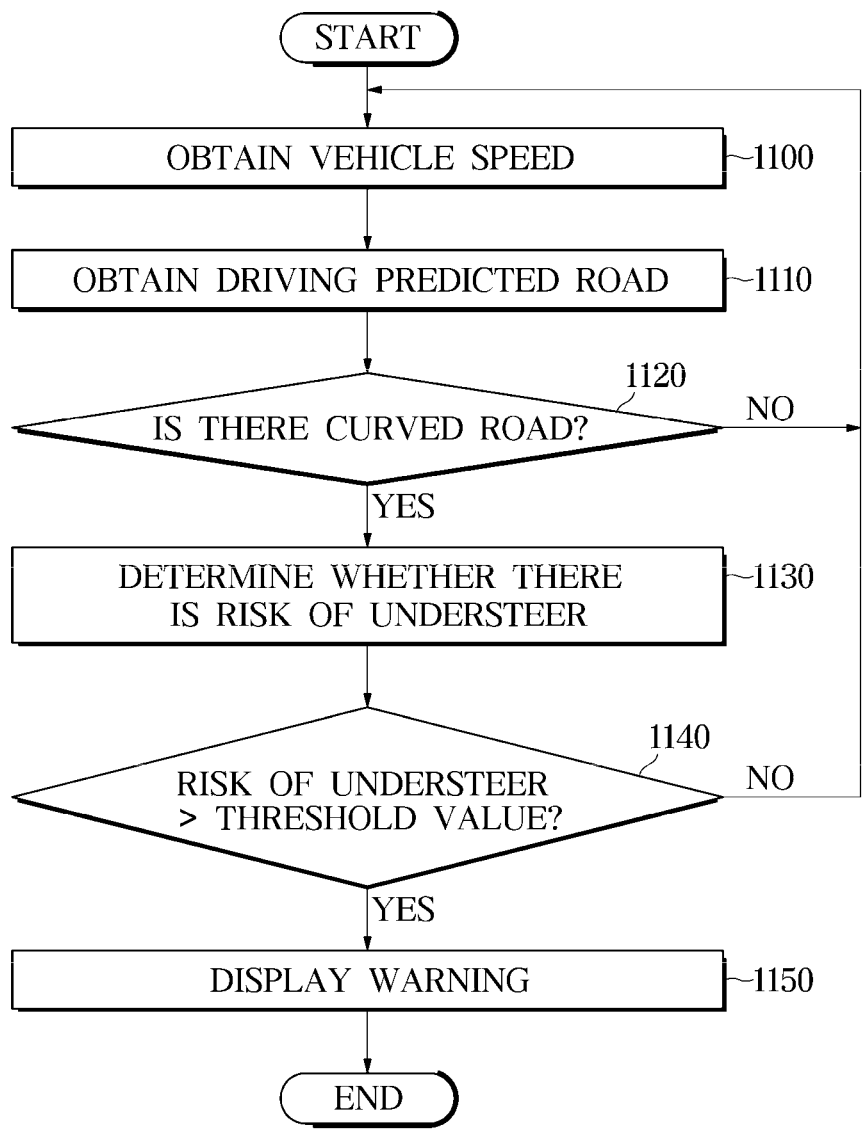
Figure 12:
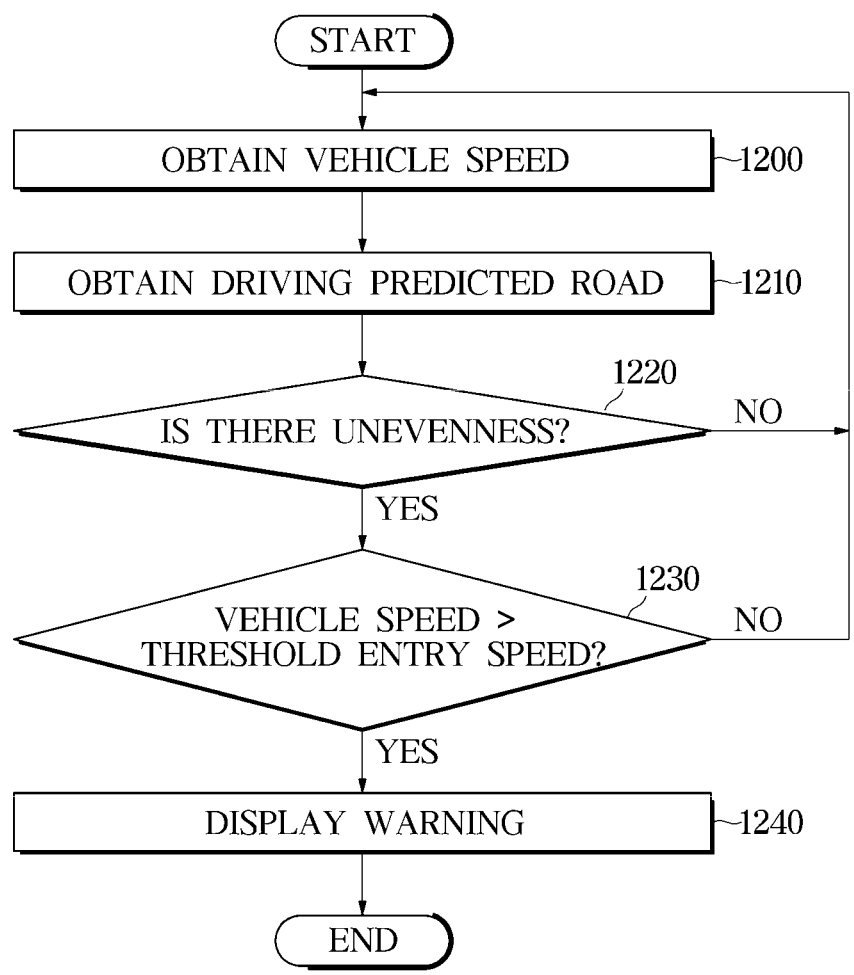

FIGS. 10 to 12 are control flowcharts of a driver assistance display apparatus according to an embodiment.

The vehicle 1 may obtain the image of the road by activating the image obtainer 210 while the driving (1000), recognize the lane of the road in the image by processing the image of the obtained road (1010), and recognize a host lane based on the recognized position of the lane.

In addition, the vehicle 1 may calculate the central axis of the driving lane in the image during image processing (1020), and may also calculate the vehicle central axis. Here, the central axis of the driving lane may be generated based on the recognized driving lane, or may predict the central axis of the driving lane based on the previously stored lane information.

Thereafter, by simultaneously displaying the central axis of the driving lane and the vehicle central axis (1040), it is possible to identify a degree of deviation of the driver from the central axis of the lane in real time.

Next, FIG. 9 is a flowchart illustrating a method of displaying a case in which there is the risk of understeer to the driver. Particularly, the driver assistance display apparatus 200 may obtain the vehicle speed (1100), and obtain a driving predicted road of the current vehicle (1110). In this case, the driving predicted road may refer to a predicted route extracted through a predicted route obtained from the navigation device. At this time, the driver assistance display apparatus 200 may determine whether there is the risk of understeer based on the current vehicle speed (1130) because the curved road exists in the obtained driving predicted road (YES in 1120). When the risk of understeer is greater than the threshold value (YES in 1140), the driver assistance display apparatus 200 may perform a warning display. In this case, the method of displaying the warning is omitted since it has been described in detail in FIG. 7.

Next, FIG. 10 is a flowchart illustrating a method of displaying a case in which an impact is expected due to the unevenness to the driver. Particularly, the driver assistance display apparatus 200 may obtain the vehicle speed (1200), and obtain the driving predicted road of the current vehicle (1210). At this time, the driver assistance display apparatus 200 may display the warning (1240) when there are the unevenness on the obtained driving predicted road (YES in 1220) and the current vehicle speed is greater than a threshold entry speed (YES in 1230). In this case, the warning display method has been described in detail with reference to FIG. 8 and thus will be omitted.

According to the disclosed embodiments, since operation states and sensor values of various types of sensors are displayed to the driver, it is possible to identify a driving state of the vehicle before an operation of a driver assistance system.

Accordingly, the disclosure may prevent the collision with another vehicle, improve a driving stability, and reduce a driver's tension while the driving.

As described above, the disclosure may improve a usability, a quality, and a marketability of the driver assistance system and the vehicle, and further increase user satisfaction and secure product competitiveness.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An apparatus for assisting driving of a host vehicle, the apparatus comprising:
 a display configured to display vehicle driving information;
 an image obtainer configured to obtain an image of a road;
 a distance detector configured to detect surrounding objects; and
 a controller configured to:
  provide notification information based on the image information of the road, the surrounding objects, and the vehicle driving information,
  in response to a curved road being included in a driving predicted route of a vehicle, determine that there is a risk of occurrence of an understeer based on a vehicle speed being greater than a preset threshold value, and
  display the notification information including the risk of occurrence of the understeer.

2. The apparatus according to claim 1, wherein the controller is configured to: identify a central axis of a driving lane based on the image information of the road, and simultaneously display the central axis of the driving lane and a central axis of a vehicle.

3. The apparatus according to claim 1, wherein the controller is configured to:
 in response to an unevenness being included in a driving predicted route of a vehicle, determine that there is a risk of occurrence of an impact based on that a vehicle speed is greater than a preset second threshold value, and
 display the notification information including the risk of occurrence of the impact.

4. The apparatus according to claim 1, wherein, based on determining that there is the risk of occurrence of the understeer, the notification information is displayed to the driver in different colors according to an amount the vehicle speed is greater than the preset threshold value.

5. The apparatus according to claim 3, wherein, based on determining that there is the risk of occurrence of the impact, the notification information is displayed to the driver in different colors according to an amount the vehicle speed is greater than the preset threshold value.

6. The apparatus according to claim 1, wherein the controller is configured to:
 generate divided around views of a vehicle, and
 based on an obstacle being detected in any one of the divided around views, differently display a color of the divided around view in which the obstacle is detected.

7. The apparatus according to claim 1, wherein the display comprises at least one of a head up display (HUD), a cluster, an augmented reality navigation, or an augmented reality windshield.

8. A host vehicle including an apparatus of claim 1.

9. A method for assisting driving of a host vehicle, the method comprising:
 obtaining, by an image obtainer, an image of a road;
 detecting, by a distance detector, surrounding objects;
 providing, by a controller, notification information based on the image information of the road, the surrounding objects, and the vehicle driving information; and
 displaying, by the controller, the notification information,
 wherein the displaying of the notification information comprises:
  in response to a curved road being included in a driving predicted route of a vehicle, determining that there is a risk of occurrence of an understeer based on a vehicle speed being greater than a preset first threshold value; and
  displaying the notification information including the risk of occurrence of the understeer.

10. The method according to claim 9, wherein the displaying of the notification information comprises:
 displaying the provided notification information on a display including at least one of a head up display (HUD), a cluster, an augmented reality navigation, or an augmented reality windshield.

11. The method according to claim 10, wherein the displaying of the notification information comprises:
 identifying a central axis of a driving lane based on the image information of the road; and
 simultaneously displaying the central axis of the driving lane and a central axis of a vehicle.

12. The method according to claim 10, wherein the displaying of the notification information comprises:
 in response to an unevenness being included in a driving predicted route of a vehicle, determining that there is a risk of occurrence of an impact based on that a vehicle speed is greater than a preset second threshold value; and
 displaying the notification information including the risk of occurrence of the impact.

13. The method according to claim 9, wherein the displaying of the notification information comprises:
 based on determining that there is the risk of occurrence of the understeer, displaying to the driver in different colors according to an amount the vehicle speed is greater than the preset threshold value.

14. The method according to claim 12, wherein the displaying of the notification information comprises:
 based on determining that there is the risk of occurrence of the impact, displaying to the driver in different colors according to an amount the vehicle speed is greater than the preset threshold value.

15. The method according to claim 10, wherein the displaying of the notification information comprises:
generating divided around views of a vehicle, and
based on an obstacle being detected in any one of the divided around views, differently displaying a color of the divided around view in which the obstacle is detected.

* * * * *